Figure 1:
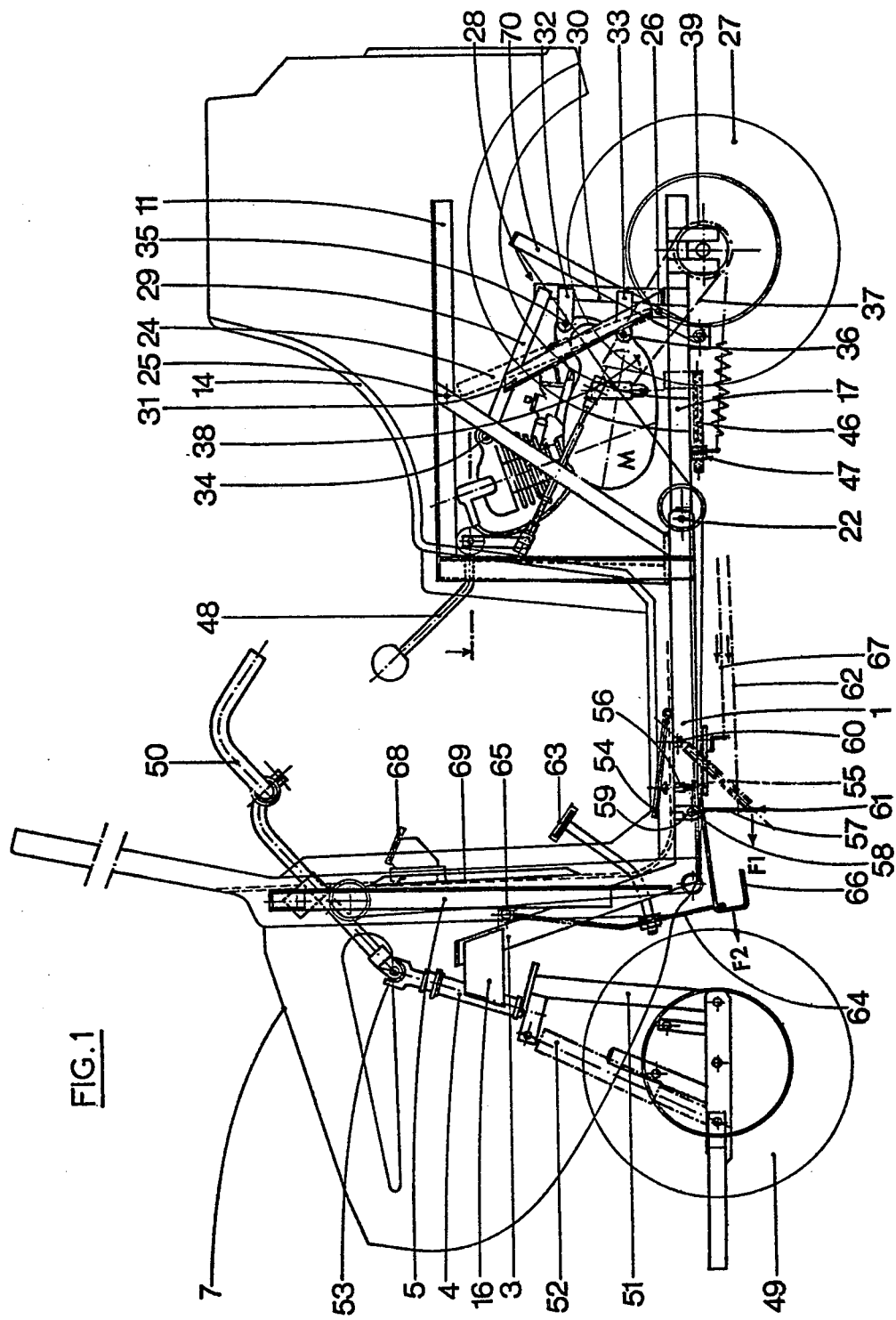

United States Patent [19]

Mery

[11] 4,114,713

[45] Sep. 19, 1978

[54] MOTORIZED THREE WHEEL VEHICLE

[76] Inventor: Pierre Mery, 11 Impasse Gaston, Cugnec 34500-Beziers, France

[21] Appl. No.: 751,965

[22] Filed: Dec. 17, 1976

[30] Foreign Application Priority Data

Dec. 18, 1975 [FR] France .................................. 75 38786

[51] Int. Cl.² .......................... B62D 61/08; B62K 5/06
[52] U.S. Cl. ...................................... 180/27; 180/32; 180/33 R
[58] Field of Search ........................... 180/27, 32, 33 R

[56] References Cited

U.S. PATENT DOCUMENTS

| 3,282,365 | 11/1966 | McReynolds | 180/27 |
|---|---|---|---|
| 3,294,190 | 12/1966 | Tosun et al. | 180/27 |
| 3,616,870 | 11/1971 | Kramer | 180/32 |
| 3,631,936 | 1/1972 | Schweser | 180/32 |

Primary Examiner—Joseph F. Peters, Jr.
Assistant Examiner—Donn M. McGiehan
Attorney, Agent, or Firm—Sherman Levy

[57] ABSTRACT

A compact automobile is provided that includes a chassis wherein the chassis consists of essentially two parts and suitable wheel axles and wherein there is also provided a cradle and shock absorbers and a frame.

4 Claims, 6 Drawing Figures

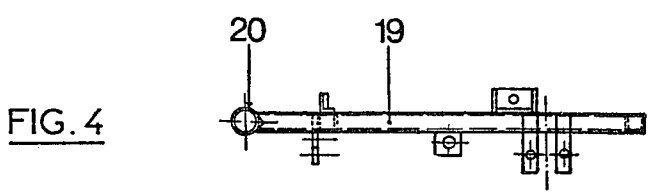
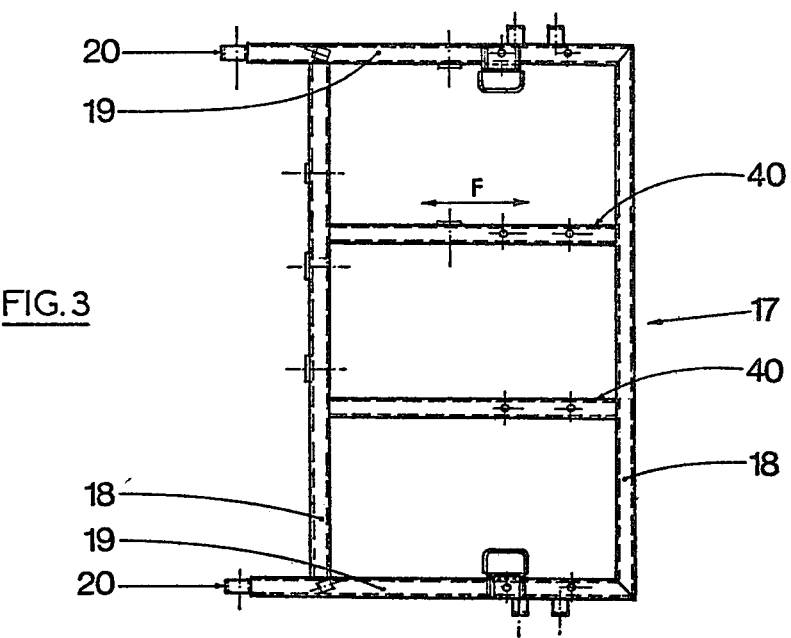
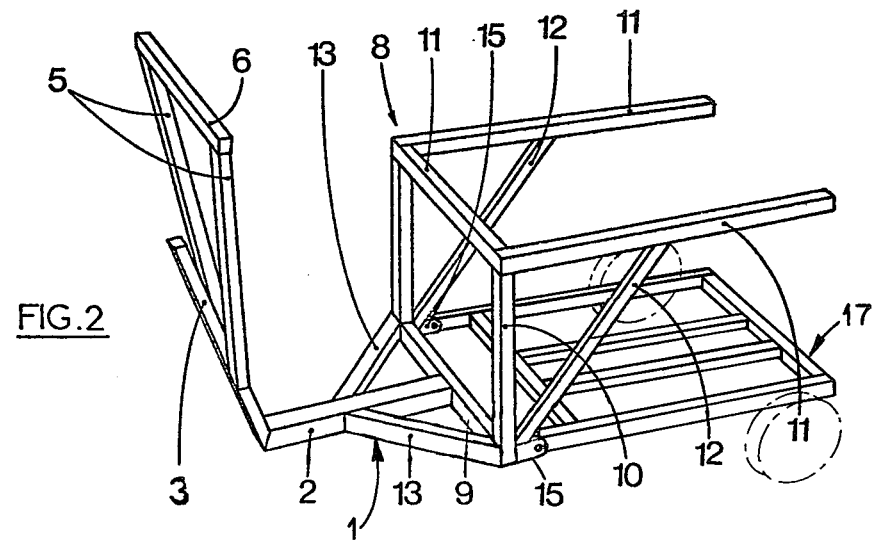

MOTORIZED THREE WHEEL VEHICLE

The invention relates to a motorized three wheel vehicle.

Vehicles are already known having a chassis supported in the front by a single directing wheel and at the rear by two drive wheels, the "supporting polygon" in this case having a triangular shape.

In this class of vehicles the means of propulsion generally consists of a small cylinder internal combustion engine and the directing wheel is controlled by means of a "fork-stem-handlebar" system. Furthermore, these body-chassis vehicles comprise acceleration means, braking means and manual control means, so that even if the motor does not operate, it is nevertheless possible to move the vehicle, especially in order to park it. These vehicles are thus self-sufficient and are designed for cities having high traffic densities.

However, these vehicles have the disadvantage that their construction is relatively complex and furthermore involves expensive equipment, which has a substantial adverse effect on their cost price.

The invention thus concerns a small cylinder automobile type vehicle consisting of a chassis supported by drive wheels and a directing wheel operated by means of a fork, stem and handlebar, the said chassis serving to secure the bodywork, and also consisting of drive means and means for controlling the vehicle, characterised in that the chassis essentially consists of two parts linked to one another, each part being supported by a wheel axle and these two constituent parts at the front and rear of the chassis being in addition kinetically connected by shock absorbers, and the said chassis supports the acceleration and braking means.

According to a feature of the invention, the rear chassis consists of a tubular frame provided with two longitudinal struts on which slides a carriage supporting the engine for driving the drive wheels, the said frame being angularly movable with respect to the front chassis and containing two bearings serving to couple it to the front chassis part.

According to one embodiment, the front chassis contains a membrane or middle strut, to the front end of which is welded a tubular fork stiffened by a cross bar and serving to secure the front part of the body, the rear part of this strut being connected by cross-pieces to a second square frame, likewise stiffened by strengthening members, serving to secure the rear part of the body and containing welded and pierced feet or lugs serving to receive the bearings of the rear chassis with the interposition of silent blocks.

According to another feature of the invention, the shock absorbers connect respectively the rear chassis and the square frame of the front chassis.

Figure 5:
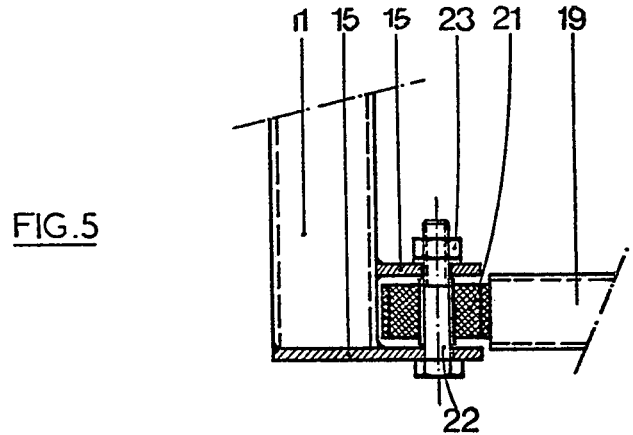
Figure 6:
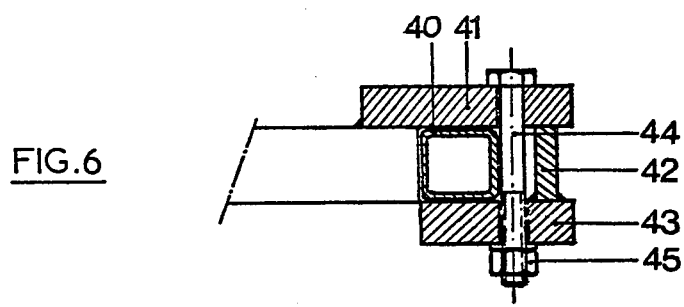

The invention will now be described by way of example with reference to the accompanying drawings in which:

FIG. 1 is a diagrammatic side elevational view of a motorized three wheel vehicle, FIG. 2 is a perspective view of the chassis of the vehicle of FIG. 1, FIG. 3 is a top plan view of the articulated rear frame of the vehicle of FIG. 1, FIG. 4 is a side elevational view of FIG. 3, FIG. 5 is an enlarged fragmentary sectional view showing in detail the coupling of the front and rear chassis, FIG. 6 is an enlarged fragmentary sectional view showing details of a sliding arrangement of an engine supporting carriage.

The motorized three wheel vehicle shown in the drawings is provided with a chassis consisting essentially of a front frame 1 and an articulated rear frame 17 connected to one other by shock absorbers. The front front 1 consists (FIG. 2) of a first section including a rib or middle strut 2 whose front end is joined to a shaped member 3 supporting a fork stem 4, as shown in FIG. 1. The shaped member 3 supports a fork 5 whose two limbs are connected by a cross-piece 6 serving to support a front housing 7 of the vehicle. The rear end of the middle strut 2 is connected, by welding for example to a second section 8 of the front frame. This second section includes a base member 9, a pair of upright posts 10 and a generally U-shaped top member 11 the arms of which extend rearwardly. Preferably, the base member 9 and the rearwardly extending arms of the top member 11 are connected to one another by welded strengthening members 12 oriented at 45°.

The U-shaped top member 11 serves to support a rear housing 14 of the body. The base member 9 of the section 8 has a pair of rearwardly extending flanges 15 at each end serving to join the front frame 1 to the rear frame 17. This front frame consists of, for the sake of lightness, rigid and undeformable welded tubular sections.

As shown in FIG. 1, the inclined front shaped section 3 of the front frame is connected to the fork support stem 4 by plates 16 welded to the shaped section 3 and to the surface of the stem 4.

The rear frame 17 (FIG. 3) is of generally rectangular configuration and includes two cross pieces 18 welded to a pair of main struts 19. Each of the struts 19 has a cylindrical sleeve 20 welded to the front end and each of such sleeves includes a resilient bearing 21. The resilient bearings 21 tend to absorb the vibrations or shaking between the front and rear frames.

The rear frame 17 is connected to the front frame by means of a threaded pin 22 passing through the flanges 15, which are pierced for this purpose, and the pin cooperates with a nut 23 and serves as an articulated pivot.

The kinematic connection between the front frame 1 and the rear frame 17 is obtained via two absorbers 24 whose two ends are respectively hooked at 25 to the arms of the U-shaped top member 11 of the section 8 of the front frame and at 26 to the struts 19 of the rear frame 17. In this way the rear frame supports a system of drive wheels 27, and the vibrations experienced by these wheels are absorbed by the absorbers 24 and by the bearings 21 situated at the pivots between the front and rear frames.

This two-part chassis also comprises an engine-supporting carriage 28 consisting of a triangular arrangement formed by the members 29, 30, and 31. The upper portion of an internal combustion engine M is connected to one end of the member 29 and the member 30 is provided with upper and lower engine mounts 32 and 33 serving to secure the engine, which is thus supported at three points corresponding respectively to reference numerals 34, 35 and 36. The drive for the drive wheels 27 is effected, in the example being discussed, by means of a drive chain 37 joining the pinion 38 of the output shaft from the engine M to a wheel sprocket 39.

In order to be able to adjust the tension in the drive chain 37, the engine-supporting carriage 28 is movably mounted with respect to the rear frame 17. The carriage 28 is slidably mounted on a pair of auxiliary struts 40 (FIG. 3) extending between the cross pieces 18 and generally parallel with the side struts 19. Each of the auxiliary struts 40 is generally square in cross-section as shown in FIG. 6. Thus, the carriage 28 may move in the direction of the arrow F (FIG. 3) along the auxiliary struts 40. In order for this to occur, the lateral ends of the carriage are provided with welded plates 41, 42 and 43 forming a C-shaped clamping structure surrounding the auxiliary struts 40 which act as guide rails, the plates 41 and 43 being connected to one another on the one hand by the plate 42, and on the other hand by bolts 44 provided with clamping nuts 45.

The adjustment of the tension of the chain is thus effected by adjusting the position of the carriage with respect to the rear frame 17 simple by the play of a threaded rod 46 rotatably carried by the carriage 28 and cooperating with a screw threaded block 47 mounted on the rear frame 17. Thus, the screwing or unscrewing of the threaded rod 46 causes the movement in one or the other direction of the carriage, which produces variations in the tension of the drive chain 37.

The engine M contains a gear change lever 48 located near the driver's seat.

The front frame 1 is supported by a directing wheel 49, which is itself controlled as regards direction, by means of the stem 4 and the handlebar 50. This wheel is connected to the stem 4 by a fork 51, and the vibrations are absorbed in the usual manner by an absorber 52.

The fork stem is in two parts joined to one another by a universal joint 53. The front frame also supports the accelerator and braking systems, as shown in FIG. 1.

The accelerator consists of a pedal 54 constantly urged upwardly by a spring 55. This pedal bears against a finger 56, which latter is urged against one leg of an angle member 57, the member 57 being tiltably mounted on a shaft 58. Such shaft is pivotally mounted in lugs 59 welded to the front frame 1. The spring 55 is secured respectively at 60 to the front frame 1 and at 61 to the other leg of the angle member 57, the latter being connected by a cable 62 to the carburetor (not shown) of the engine M The effect of depressing the pedal 54 is to displace the finger 56 downwardly which, when bearing against the angle member 57, causes the latter to tilt abouts its shaft 58, according to the arrow F1, thereby producing a effect on the cable 62 and accordingly a proportional opening of the engine carburetor. As soon as the pedal is no longer actuated, the spring 55 retracts the angle member 57 into the neutral position (which can be seen in FIG. 1), which retracts the finger 56 to its starting position and also causes the pedal to regain its initial position.

This accelerator device is a highly reliable simple construction since there are few parts between the control pedal and the engine carburetor.

The braking device also consists (FIG. 1) of a pedal 63 connected to a rod 64 pivotally connected at 65 to the front frame 1. This rod 64 is connected to a C-shaped member 66 slidably mounted on the front frame 1. One end of a brake cable 67 is connected to the member 66 and the other end is connected to the brake shoes of the drive wheels 27. It can thus be seen that engagement of the pedal 63 determines the forward displacement of the rod 64, and consequently, of the C-shaped member 66 and cable 67 which is attached thereto. This pulling effect on the cable causes the brake drums to close.

When pressure is no longer exerted on the pedal 63, the system returns to its starting position under the action of a return spring (not shown).

The vehicle, which is designed to operate in particular in an urban environment, takes up a minimum amount of space and is of a mechanically simple design, which factors give it a high degree of strength and reliability. Moreover, it is provided with a small cylinder engine (47 cm$^3$) in the example considered.

Finally, it is very simple to control since its operation is comparable to a simple moped, and it may therefore be driven by young road users.

The device is of course provided with a conventional lights system, not shown, and its bodywork may be of widely differing designs without going beyond the scope of the invention.

It is possible to replace some of the aforementioned systems and units described above by other equivalent means without exceeding the scope of the accompanying claims. Thus, the handlebar 50 may be replaced by a rudder bar, and otherbraking or accelerator systems may be utilized.

What we claim is:

1. A relatively small articulated three wheeled vehicle comprising a chassis including a front frame and an articulated rear frame, a directing wheel mounted on said front frame, means for steering said directing wheel to control the direction of movement of the vehicle, a pivotal coupling connecting said rear frame to said front frame, shock absorbing means connecting a portion of said front frame to a portion of said rear frame in spaced relationship to said pivotal coupling, said rear frame including a pair of generally parallel, longitudinal side struts connected by a pair of generally parallel, transverse cross pieces, at least one drive wheel rotatably mounted on said movable frame, a power plant carriage slidably mounted on said rear frame, said carriage including a plurality of power plant support members, means for mounting a power plant on said support members, means drivingly connecting said power plant and said drive wheel, means for selectively moving said power plant carriage relative to said rear frame to adjust said driving connecting means, and clampable plates for securing said carriage in fixed adjusted position on said rear frame.

2. The invention of claim 1 in which said rear frame includes a pair of auxiliary struts extending between said transverse cross pieces generally parallel to said side struts, said power plant carriage being slidably mounted on said auxiliary struts for longitudinal movement.

3. The invention of claim 1 in which said means for moving said power plant carriage includes a threaded rod rotatably carried by said carriage, said rod cooperatively engaging a threaded block mounted on said rear frame.

4. The invention of claim 1 in which said pivotal coupling includes resilient bearings for absorbing vibrations between said front and rear frames.

* * * * *